United States Patent [19]
Kuwabara

[11] Patent Number: 5,927,040
[45] Date of Patent: Jul. 27, 1999

[54] AUTOMOBILE WINDOW MOLDING

[75] Inventor: Masahiro Kuwabara, Obu, Japan

[73] Assignee: Toyota Jidosha Kabushiki Kaisha, Aichi-Ken, Japan

[21] Appl. No.: 08/906,337

[22] Filed: Aug. 5, 1997

[30] Foreign Application Priority Data

Aug. 9, 1996 [JP] Japan ................................ 8-211308

[51] Int. Cl.⁶ .................................................. B60J 10/02
[52] U.S. Cl. ................... 52/716.8; 52/716.5; 52/717.01; 52/717.05; 49/490.1; 296/93
[58] Field of Search .................... 52/208, 716.5, 52/716.8, 717.01, 717.05; 49/489.1, 490.1; 296/93

[56] References Cited

U.S. PATENT DOCUMENTS

| | | | |
|---|---|---|---|
| 5,248,179 | 9/1993 | Biermacher et al. | 296/93 X |
| 5,283,100 | 2/1994 | Yui et al. | 296/93 X |
| 5,480,207 | 1/1996 | Gold | 296/93 |
| 5,688,016 | 11/1997 | Gold | 52/208 X |

*Primary Examiner*—Christopher Kent
*Attorney, Agent, or Firm*—Dennison, Meserole, Scheiner & Schultz

[57] ABSTRACT

An automobile window molding including a molding body to be installed in a clearance between a peripheral edge of a windshield and a peripheral wall of a window frame, and a seal lip which protrudes from the outside of the molding body and which elastically transforms to a curved shape in such a manner that a tip portion thereof contacts the peripheral wall of the window frame, the seal lip decreasing in thickness from a base portion to a middle portion thereof and having an elastically transformable portion of thin thickness formed between the base portion and the middle portion and increasing in thickness from the elastically transformable portion to the tip portion, the tip portion being formed in thick section.

11 Claims, 4 Drawing Sheets

AUTOMOBILE WINDOW MOLDING

BACKGROUND OF THE INVENTION

1. Field of the Invention

The present invention relates to an automobile window molding to be installed in a clearance between a windshield and a window frame.

2. Description of the Prior Art

Conventionally, as shown in FIGS. 6 and 7, an automobile window molding 110 comprises a molding body 111 which is installed in a clearance 106 between a peripheral edge of a windshield 105 and a peripheral wall 102 of a window frame 101, and a seal lip 115 which protrudes from the outside of the molding body 111 and which transforms elastically to a curved shape in such a manner that a tip portion 118 contacts the peripheral wall 102 of the window frame 101.

Further, with the automobile window molding 110 thus formed, it was common that the seal lip 115 protruded on the outside of the molding body 111 decreases in thickness gradually from a base portion 111 to the tip portion 118 and thus the tip portion 118 becomes thin.

While an automobile is running, as shown in FIG. 6, a negatively pressurized portion 120 is created on the outside of the curved portion of the seal lip 115 by the wind stream moving from the windshield 105 to a roof panel 103 on the outside of the window frame 101, through a head portion 112 of the molding body 111. On the other hand, air comes from a lower end of a side molding portion 110c into the clearance 106 sealed by the seal lip 115. Further, in an upper molding portion 110a, the difference in pressure between the negatively pressurized portion 120 and the clearance 106 causes the seal lip 115 to be sucked out, and the air entered into the clearance 106 blows out instantly.

In such a case, with the conventional automobile window molding 110, since the tip portion 118 of the seal lip 115 is thin, the air blow-out causes the tip portion 118 of the seal lip 115 to vibrate violently and produce noises. To prevent the noises, it is required to block the lower portion of the clearance 106 by applying a filler 130 to the clearance 106, and accordingly, it has brought a problem of increased cost.

SUMMARY OF THE INVENTION

In view of the above-mentioned disadvantage, an object of the present invention is to provide an automobile window molding capable of suppressing the vibration of a seal lip and reducing the generation of noises without using a filler.

In order to achieve the object, the present invention provides an automobile window molding including a molding body to be installed in a clearance between a peripheral edge of a windshield and a peripheral wall of a window frame, and a seal lip which protrudes from the outside of the molding body and which elastically transforms to a curved shape in such a manner that a tip portion thereof contacts the peripheral wall of the window frame, the seal lip decreasing in thickness from a base portion to a middle portion thereof and having an elastically transformable portion of thin thickness formed at the middle portion and increasing in thickness from the elastically transformable portion to the tip portion, the tip portion being formed in thick section.

Accordingly, while an automobile is running, when the seal lip is sucked out by the pressure difference between the negatively pressurized portion created on the outside of the curved portion of the seal lip and the clearance on the inside of the curved portion of the seal lip, and when the air in the clearance blows out, the tip portion of the seal lip vibrates gently on the elastically transformable portion which functions as a fulcrum.

Further, the tip portion of the seal lip may be located in a lower position than that of the molding body when the molding body is installed in the clearance between the peripheral edge of the windshield and the peripheral wall of the window frame.

Accordingly, the tip portion of the seal lip is hardly influenced by the air stream moving from the windshield to the roof panel on the outside of the window frame through the molding body.

Other objects and features of the invention will be more fully understood from the following detailed description and appended claims when taken with the accompanying drawings.

DETAILED DESCRIPTION OF THE PREFERRED EMBODIMENTS

Figure 1:
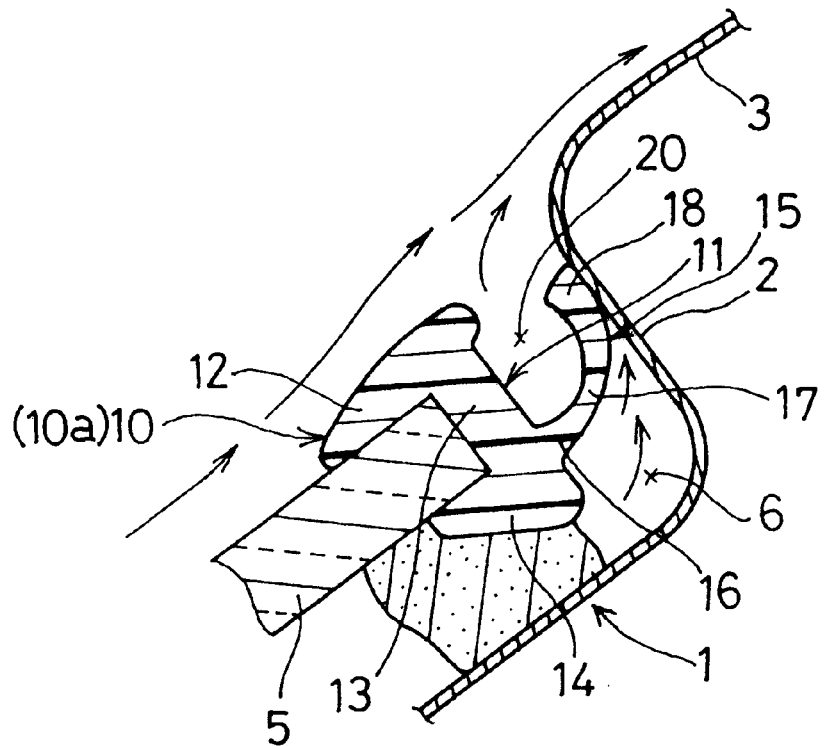
FIG. 1 is a sectional view of an automobile window molding according to a first embodiment of the present invention, illustrating the same in its installed position.

A first embodiment of the present invention will now be explained with reference to FIGS. 1 to 3. In FIGS. 1 and 3, an automobile window molding 10, which is installed in a clearance between a windshield 5 and a peripheral wall 2 of a window frame 1, is formed of elastic material such as soft synthetic resin and rubber, and is molded into one-piece construction by extrusion. Further, the window molding 10 is comprised of an upper molding portion 10a, a corner molding portion 10b and a side molding portion 10c in continuity.

Further, the window molding 10 is provided with a molding body 11 having a head portion 12, a leg portion 13 and a retaining portion 14 as viewed in cross section, and with a seal lip 15 which protrudes from the outside of the leg portion 13 of the molding body 11 and which elastically transforms to a curved shape in such a manner that a tip portion 18 contacts the peripheral wall 2 of the window frame 1.

The seal lip 15 decreases in thickness from a base portion 16 to a middle portion, and a thin elastically transformable portion 17 is formed at or near the middle portion of the seal lip 15. Further, the seal lip 15 increases in thickness from the elastically transformable portion 17 to the tip portion 18, and the tip portion 18 is formed in thick section.

Figure 2:
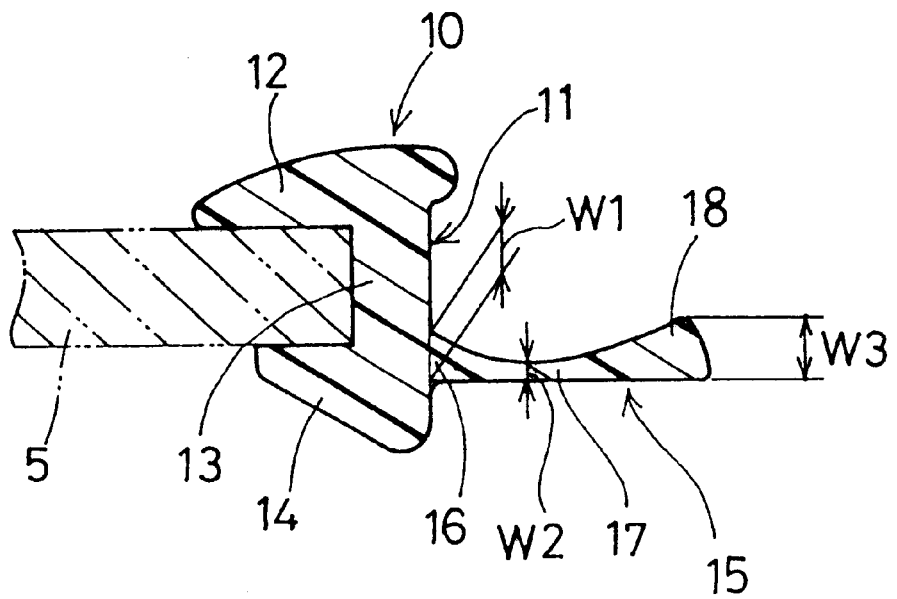
FIG. 2 is a sectional view illustrating the automobile window molding of the first embodiment in its free position prior to installation.
Figure 3:
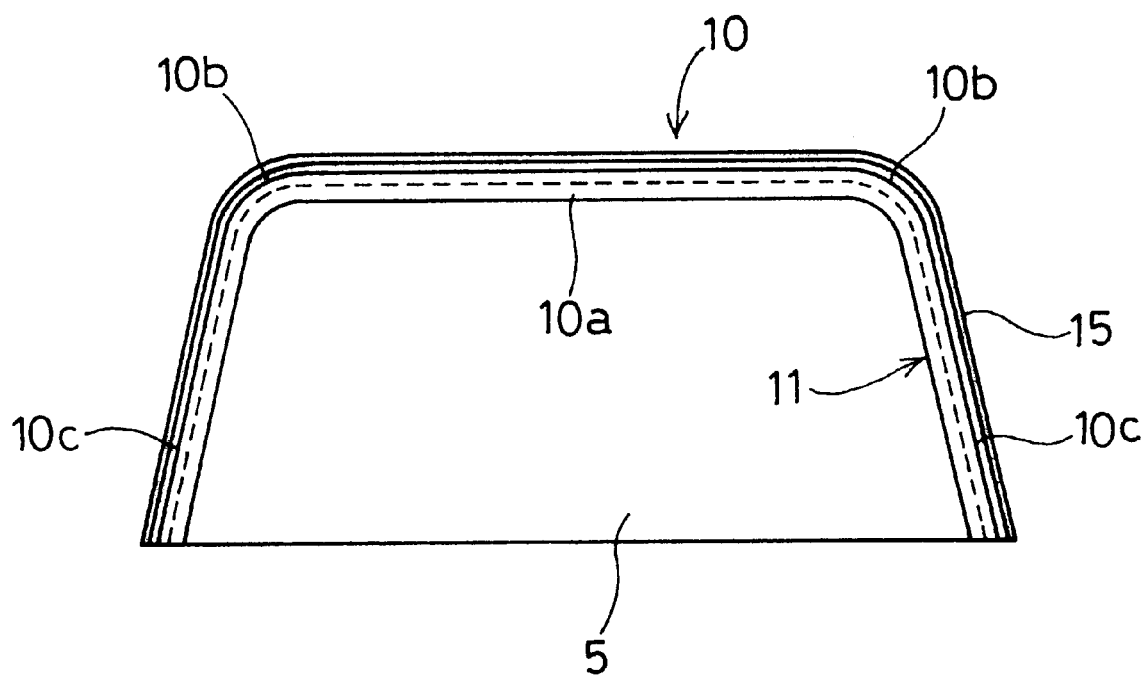
FIG. 3 is a schematic view illustrating the relationship between an automobile windshield and an automobile window molding.

Further, in this embodiment, as illustrated in FIG. 2, the thickness W1 of the base portion 16 is set up approximately 1.8 times or above and the thickness W3 of the tip portion 18 is set up approximately 2 times or above as large as the thickness W2 of the elastically transformable portion 17. Since the thickness W1 of the base portion 16 is 1.8 times or above as large as the thickness W2 of the elastically transformable portion 17, the seal lip 15 bents in a stable manner at the corner molding portion 10b following the bending of the molding body 11.

As shown in FIG. 1, with the molding body 11 installed in the clearance 6 between the peripheral edge of the windshield 5 and the peripheral wall 2 of the window frame 1, in order to reduce the influence exerted to the seal lip 15 by the air stream flowing from the windshield 5 to a roof panel 3 on the outside of the window frame 1 through the molding body 11, while an automobile is running, the tip portion 18 of the seal lip 15 is set up at a lower position than the upper face of the head portion 12 of the molding body 11. Further, the end face of the tip portion 18 of the seal lip 15 is formed on the inclined surface which increases in height toward the peripheral wall 2 of the window frame 1. Thus, the seal lip 15 is of such structure as to be hardly influenced by the air stream.

The first embodiment is composed as mentioned above. Therefore, as shown in FIG. 1, when the automobile window molding 10 is installed in the clearance 6 between the peripheral edge of the windshield 5 and the peripheral wall 2 of the window frame 1, the seal lip 15 transforms elastically to a curved shape in such a manner that the tip portion 18 contacts the peripheral wall 2 of the window frame 1. While an automobile is running, the air stream flowing from the windshield 5 to the roof panel 3 on the outside of the window frame 1 through the head portion 12 of the molding body 11 creates a negatively pressurized portion 20 on the outside of a curved portion of the seal lip 15. On the other hand, air flows from a lower portion of the side molding portion 10c into the clearance 6 sealed by the seal lip 15. Then, at the upper molding portion 10a, the pressure difference created between the negatively pressurized portion 20 and the clearance 6 causes the seal lip 15 to be sucked out, and the air flown into the clearance 6 blows out from the seal lip 15 at the upper molding portion 10a. At this time, the tip portion 18 of the seal lip 15 vibrates gently on the elastically transformable portion 17 which functions as a fulcrum. Therefore, the problem that the seal lip 15 violently vibrates and produces noises can be avoided. Consequently, the need for blocking the lower portion of the clearance 6 by applying a filler to the clearance 6 at the lower portion of the side molding portion 10c can be eliminated, and the cost can be reduced.

Further, the tip portion 18 of the seal lip 15 is set up at a lower position than the upper face of the head portion 12 of the molding body 11, and the end face of the tip portion 18 of the seal lip 15 is formed on the inclined surface which increases in height toward the peripheral wall 2 of the window frame 1, and these factors can provide such a structure as to make the influence of air stream as small as possible. Therefore, the vibration of the seal lip 15 is much better suppressed, and a great effect can be obtained in preventing the generation of noises.

Figure 4:
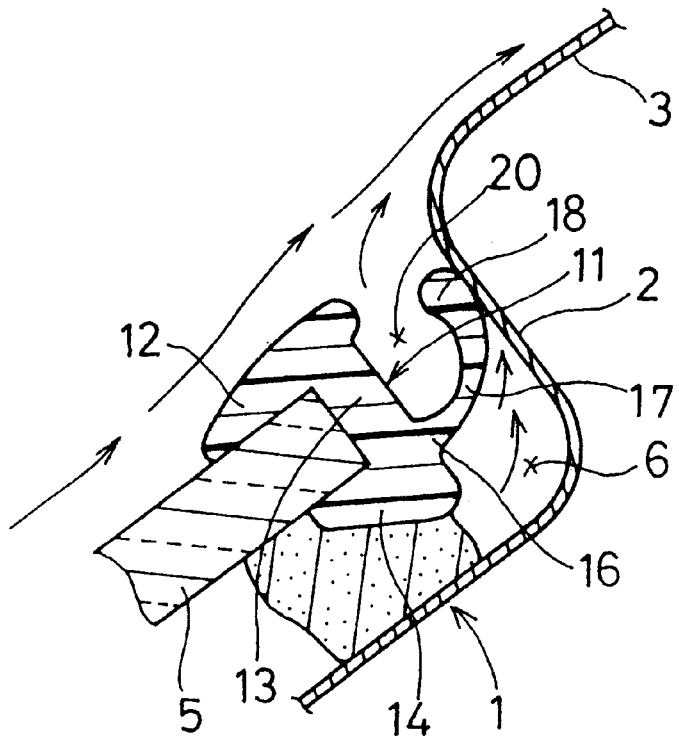
FIG. 4 is a sectional view of an automobile window molding according to a second embodiment of the present invention, illustrating the same in its installed position.
Figure 5:
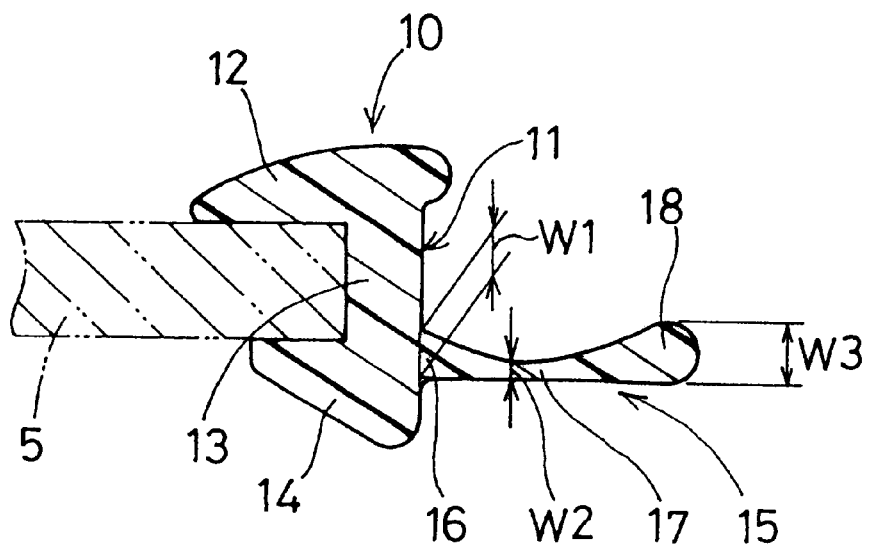
FIG. 5 is a sectional view illustrating the automobile window molding of the second embodiment in its free position prior to installation.
Figure 6:
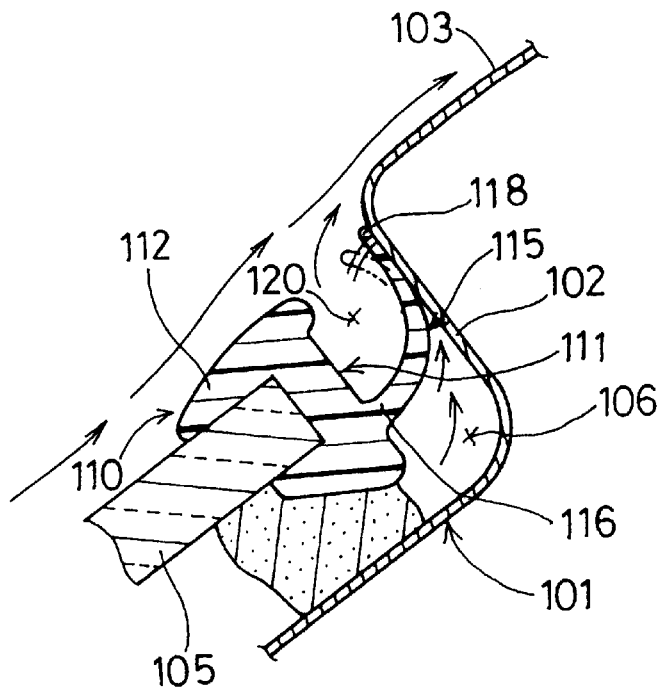
FIG. 6 is a sectional view illustrating a conventional automobile window molding in its installed position.
Figure 7:
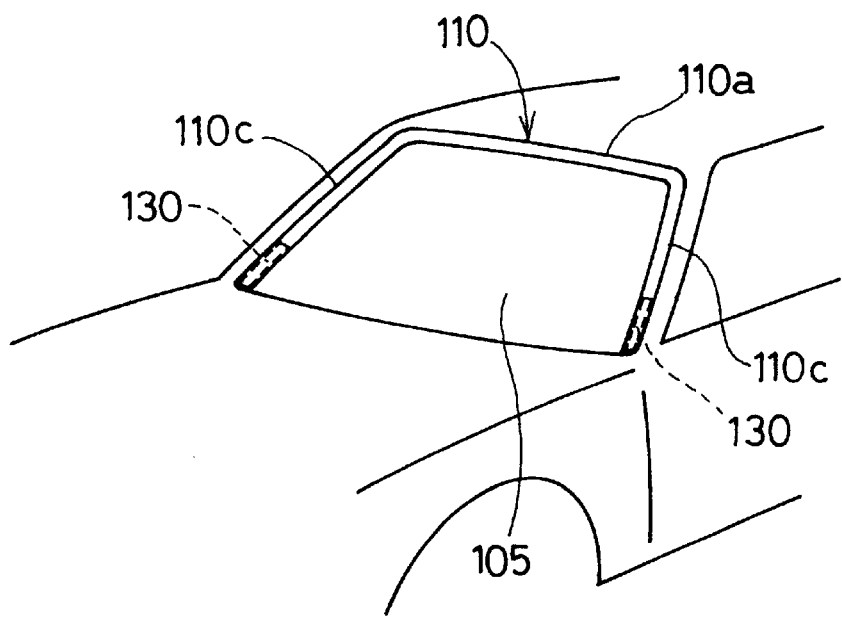
FIG. 7 is a schematic view illustrating the relationship between an automobile windshield and a conventional automobile window molding.

A second embodiment of the present invention will now be explained with reference to FIGS. 4 and 5. In this embodiment, the cross-sectional shape of the tip portion 18 of the seal lip 15, which protrudes from the outside of the leg portion 13 of the molding body 11 and which elastically transforms to a curved shape so as to contact the peripheral wall 2 of the window frame 1, is formed to be substantially arcuate shape.

The relation among the respective thicknesses W1, W2 and W3 of the base portion 16, the elastically transformable portion 17 and the tip portion 18 of the seal lip 15 is set up in the same way as in the first embodiment, and compared with the thickness W2 of the elastically transformable portion 17, the thickness W1 of base portion 16 is set up 1.8 times or above, and the thickness W3 of the tip portion 18 is set up 2 times or above. Furthermore, the tip portion 18 of the seal lip 5 is located at a lower position than the upper face of the head portion 12 of the molding body 11.

Other construction is the same as that of the first embodiment, and therefore, its explanation is omitted by assigning the same numerals to the same parts. Therefore, in the second embodiment, substantially the same function and effect can be obtained as illustrated in the first embodiment.

As described above, the automobile window molding of the present invention can suppress the vibration of the seal lip and reduce the generation of noises without using a filler and further reduce the cost.

While the invention has been described with reference to specific embodiments, the description is illustrative and is not to be construed as limiting the scope of the invention. Various modifications and changes may occur to those skilled in the art without departing from the spirit and scope of the invention as defined by the appended claims.

What is claimed is:

1. An automobile window molding comprising a molding body to be installed in a clearance between a peripheral edge of a windshield and a peripheral wall of a window frame, said molding body comprising a lea portion, a head portion integral with and extending laterally from said leg portion to a first side thereof, a retaining portion integral with and extending laterally from said leg portion to said first side thereof and spaced from said head portion to define a channel for reception of said peripheral edge of said windshield therein, and a seal lip which protrudes outward from a second opposite side of said molding body leg portion adjacent said retaining portion and which elastically transforms to a curved shape with a tip portion thereof laterally spaced from said second side for contact with the peripheral wall of said window frame, said seal lip progressively decreasing in thickness from a base portion at said second side of said leg portion to a middle portion thereof, forming an elastically transformable portion of reduced thickness, and progressively increasing in thickness from the elastically transformable portion to a maximum thickness at the tip portion.

2. The automobile window molding as defined in claim 1, wherein the tip portion of said seal lip is located inward relative to said head portion toward said retaining portion when said molding body is installed in the clearance between the peripheral edge of the windshield and the peripheral wall of the window frame.

3. The automobile window molding as defined in claim 1, wherein the tip portion of said seal lip has arcuate shape in cross section.

4. The automobile window molding as defined in claim 2 wherein said maximum thickness at said tip portion of said seal lip is at least approximately two times as great as said reduced thickness of said elastically transformable portion, said seal lip at said base portion having a thickness at least approximately 1.8 times as great as said reduced thickness.

5. The automobile window molding as defined in claim 1 wherein said maximum thickness at said tip portion of said seal lip is at least approximately two times as great as said reduced thickness of said elastically transformable portion, said seal lip at said base portion having a thickness at least approximately 1.8 times as great as said reduced thickness.

6. The automobile window molding as defined in claim 2 wherein the tip portion of said seal lip is located inward relative to a roof panel integral with the window frame and toward the retaining portion when said molding body is installed in the clearance between the peripheral edge of the windshield and the peripheral wall of the window frame.

7. The automobile window molding as defined in claim 6 wherein said tip portion has an end face inclined upward toward the peripheral wall of the window frame when the molding body is installed.

8. The automobile window molding as defined in claim 1 wherein the tip portion of said seal lip is located inward relative to a roof panel integral with the window frame and toward the retaining portion when said molding body is installed in the clearance between the peripheral edge of the windshield and the peripheral wall of the window frame.

9. An automobile window molding comprising a molding body to be installed in a clearance between a peripheral edge of a windshield and a peripheral wall of a window frame, said molding body, when installed, comprising:

- a head portion for contacting a first surface of the windshield;
- a retaining portion for contacting a second surface of the windshield;
- a leg portion interconnecting the head portion and the retaining portion; and
- a seal lip extending from the leg portion and for extending toward the peripheral wall of the window frame, said seal lip comprising an elastically transformable portion capable of bending into a curved shape, and a tip portion outward from the leg portion of the molding body and for contacting the peripheral wall of the window frame, said seal lip progressively increasing in thickness from the elastically transformable portion to the tip portion, wherein said tip portion has a thickness greater than that of said elastically transformable portion.

10. The automobile window molding as defined in claim 9 wherein the tip portion of said seal lip is located inward relative to a roof panel integral with the window frame and toward the retaining portion when said molding body is installed in the clearance between the peripheral edge of the windshield and the peripheral wall of the window frame.

11. The automobile window molding as defined in claim 9 wherein the tip portion of said seal lip has an arcuate shape in cross section.

\* \* \* \* \*

UNITED STATES PATENT AND TRADEMARK OFFICE
CERTIFICATE OF CORRECTION

PATENT NO. : 5,927,040
DATED : July 27, 1999
INVENTOR(S) : MASAHIRO KUWABARA

It is certified that error appears in the above-identified patent and that said Letters Patent is hereby corrected as shown below:

Title page, following "Assignee": amend to include:

--TOYOTA JIDOSHA KABUSHIKI KAISHA, and TOKAI KOGYO KABUSHIKI KAISHA, both of AICHI-ken, JAPAN--.

Signed and Sealed this

Fifteenth Day of February, 2000

Attest:

Q. TODD DICKINSON

*Attesting Officer*              *Commissioner of Patents and Trademarks*